United States Patent
Jiang et al.

(10) Patent No.: US 8,834,615 B2
(45) Date of Patent: Sep. 16, 2014

(54) AIR CLEANING UNIT AND STORAGE SYSTEM USING THE SAME

(71) Applicant: Shenzhen China Star Optoelectronics Technology Co., Ltd., Guangdong (CN)

(72) Inventors: Yunshao Jiang, Shenzhen (CN); Chunhao Wu, Shenzhen (CN); Kunhsien Lin, Shenzhen (CN); Yongqiang Wang, Shenzhen (CN); Zhiyou Shu, Shenzhen (CN); Zhenhua Guo, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 81 days.

(21) Appl. No.: 13/704,306

(22) PCT Filed: Nov. 30, 2012

(86) PCT No.: PCT/CN2012/085607
§ 371 (c)(1),
(2), (4) Date: Dec. 14, 2012

(87) PCT Pub. No.: WO2014/079094
PCT Pub. Date: May 30, 2014

(65) Prior Publication Data
US 2014/0137742 A1    May 22, 2014

(51) Int. Cl.
*B01D 53/02* (2006.01)
*B01D 46/00* (2006.01)

(52) U.S. Cl.
CPC .................................. *B01D 46/0036* (2013.01)
USPC .................................. 96/134; 96/135; 96/142

(58) Field of Classification Search
CPC ..................................................... B01D 43/0036
USPC ........................................................... 96/134
See application file for complete search history.

(56) References Cited

U.S. PATENT DOCUMENTS

| | | | | |
|---|---|---|---|---|
| 5,772,738 A * | 6/1998 | Muraoka | | 96/129 |
| 6,368,393 B1 * | 4/2002 | Hironaka | | 96/111 |
| 6,986,803 B1 * | 1/2006 | Richards | | 95/71 |
| 7,520,921 B2 * | 4/2009 | Arai et al. | | 96/135 |
| 7,540,901 B2 * | 6/2009 | Kishkovich et al. | | 95/141 |

* cited by examiner

*Primary Examiner* — Christopher P Jones
(74) *Attorney, Agent, or Firm* — Andrew C. Cheng

(57) ABSTRACT

The present invention provides an air cleaning unit which contains a blower, an acid/alkaline filter device, and a particle filter device. The blower draws in outside air through the acid/alkaline filter device and produces an air flow through the particle filter device. The acid/alkaline filter device absorbs the acid/alkaline gases in the outside air. The particle filter device traps the particles in the air flow. Through this design, the blower draws in air filtered by the acid/alkaline filter device. The blower therefore does not suffer erosion and therefore the air cleaning unit enjoys prolonged operation life span.

2 Claims, 3 Drawing Sheets

AIR CLEANING UNIT AND STORAGE SYSTEM USING THE SAME

BACKGROUND OF THE INVENTION

1. Field of the Invention

The present invention generally relates to liquid crystal display panel, and particularly relates to a storage system for glass substrates and an air cleaning unit applied to the storage system.

2. The Related Arts

The yield of glass substrates is adversely affected by the particles in the air and therefore the manufacturing of OLED (organic light emitting diode) display panel is conducted in highly particle-free clean rooms.

Taking a storage system as example, the storage system contains a storage cabinet and a stacking device. Additionally, there are always workers entering and leaving the storage system for repair and maintenance. The workers, the stacking device, and the storage cabinet are all sources of dust and, to keep a clean air, the dust particles have to be quickly removed from the clean rooms by airflow.

Currently blower and filter units are installed on top of the storage cabinet. Airflow is introduced into the storage system from top to bottom through the blower and filter units, and then expelled through air outlets.

A blower and filter unit contains a blower and a filter, capable of filtering the dust particles in the air. However, as the air is filtered, the blower is often eroded by the acid and alkaline components in the air, thereby reducing the blower and filter unit's operation life span.

SUMMARY OF THE INVENTION

The technical issue to be addressed by the present invention is to provide an air cleaning unit capable of filtering acid and alkaline gases and a storage system incorporating the air cleaning units for the storage of display panels.

To address the technical issue, the present invention provides an air cleaning unit comprising a blower, an acid/alkaline filter device, a particle filter device, and a case having an air inlet and an air outlet; wherein the blower draws outside air through the acid/alkaline filter device and produces an air flow through the particle filter device; the acid/alkaline filter device absorbs acid/alkaline gases from the outside air; the particle filter device traps particles from the air flow; the acid/alkaline filter device comprises a first filter layer and a second filter layer; the first filter layer absorbs the acid gases; the second filter layer absorbs the alkaline gases; and the acid/alkaline filter device is positioned outside the case and covers the air inlet.

The air cleaning unit further comprises an inlet pipe connected to and surrounding the air inlet, wherein the acid/alkaline filter device is positioned in the inlet pipe.

The blower and the particle filter device are housed in the case, and are positioned between the air inlet and the air outlet.

The blower is positioned between the air inlet and the particle filter device.

The air cleaning unit further comprises a flow balance device positioned between the blower and the particle filter device.

The air cleaning unit further comprises an ion production device for adding ions into the air flow.

To address the technical issue, the present invention further provides another air cleaning unit comprising a blower, an acid/alkaline filter device, and a particle filter device; wherein the blower draws in outside air through the acid/alkaline filter device and produces an air flow through the particle filter device; the acid/alkaline filter device is for absorbing the acid/alkaline gases in the outside air; and the particle filter device is for trapping the particles in the air flow.

The acid/alkaline filter device comprises a first filter layer and a second filter layer; the first filter layer absorbs the acid gases in the outside air; and the second filter layer absorbs the alkaline gases in the outside air.

The air cleaning unit further comprises a case having an air inlet and an air outlet; wherein the acid/alkaline filter device is positioned outside the case and covers the air inlet.

The air cleaning unit further comprises an inlet pipe connected to and surrounding the air inlet, wherein the acid/alkaline filter device is positioned in the inlet pipe.

The blower and the particle filter device are housed in the case, and are positioned between the air inlet and the air outlet.

The blower is positioned between the air inlet and the particle filter device.

The air cleaning unit further comprises a flow balance device positioned between the blower and the particle filter device.

The air cleaning unit further comprises an ion production device for adding ions into the air flow.

To address the technical issue, the present invention further provides a storage system for display panels comprising a storage cabinet and a plurality of air cleaning units delivering air flows to the storage cabinet, wherein each air cleaning unit comprises a blower, an acid/alkaline filter device, a particle filter device, and a case having an air inlet and an air outlet; the blower draws outside air through the acid/alkaline filter device and produces an air flow through the particle filter device; the acid/alkaline filter device absorbs acid/alkaline gases from the outside air; the particle filter device traps particles from the air flow; the acid/alkaline filter device comprises a first filter layer and a second filter layer; the first filter layer absorbs the acid gases; the second filter layer absorbs the alkaline gases; and the acid/alkaline filter device is positioned outside the case and covers the air inlet.

The storage cabinet comprises a top plate, a bottom plate opposing the top plate; the air cleaning units are configured on the top plate; and a plurality of exhausts are configured on the bottom plate.

The air cleaning unit further comprises an inlet pipe connected to and surrounding the air inlet; and the acid/alkaline filter device is positioned in the inlet pipe.

The blower and the particle filter device are housed in the case, and are positioned between the air inlet and the air outlet.

The blower is positioned between the air inlet and the particle filter device.

The air cleaning unit further comprises an ion production device for adding ions into the air flow.

The advantage of the present invention is as follows. In contrast to the prior art, the blower of each air cleaning unit draws in air filtered by the acid/alkaline filter device. The blower therefore does not suffer erosion and therefore the air cleaning unit enjoys prolonged operation life span.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present inven- In the drawings.

DETAILED DESCRIPTION OF THE PREFERRED EMBODIMENTS

Figure 1:
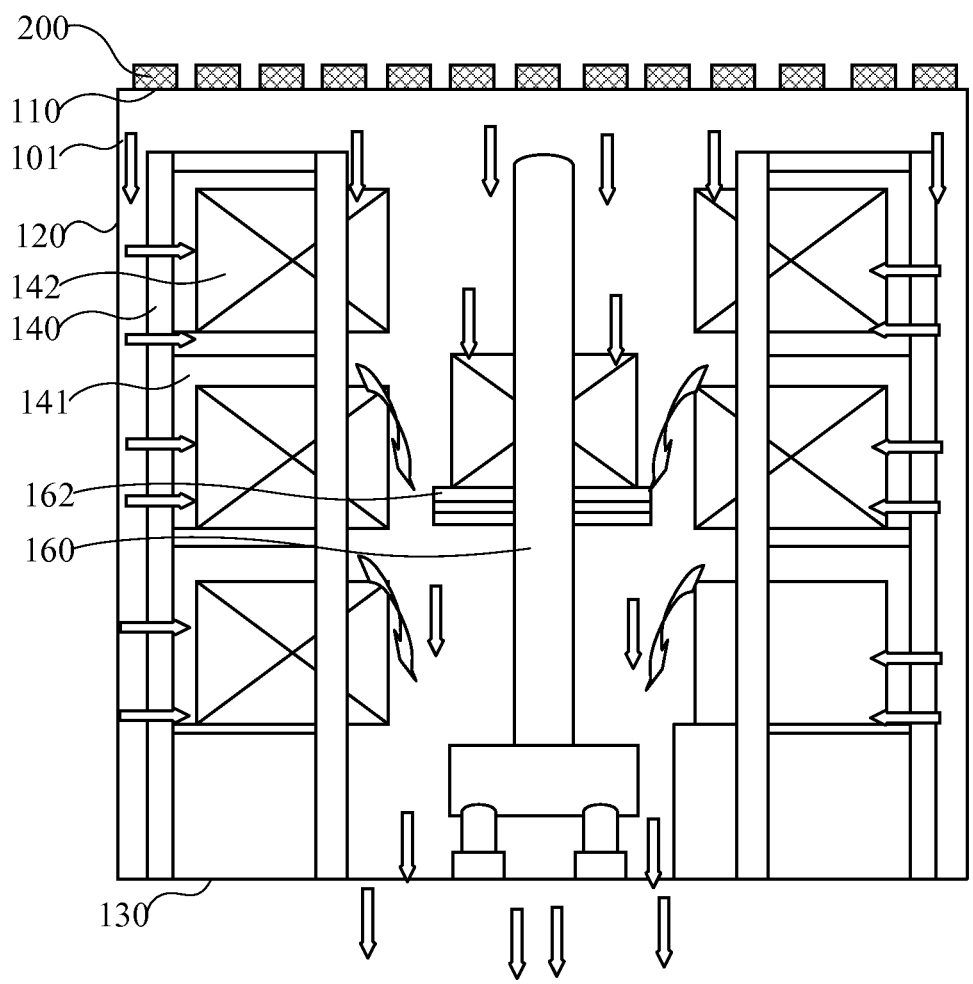
FIG. 1 is a schematic side-view diagram showing a storage system according to an embodiment of the present invention.
Figure 2:
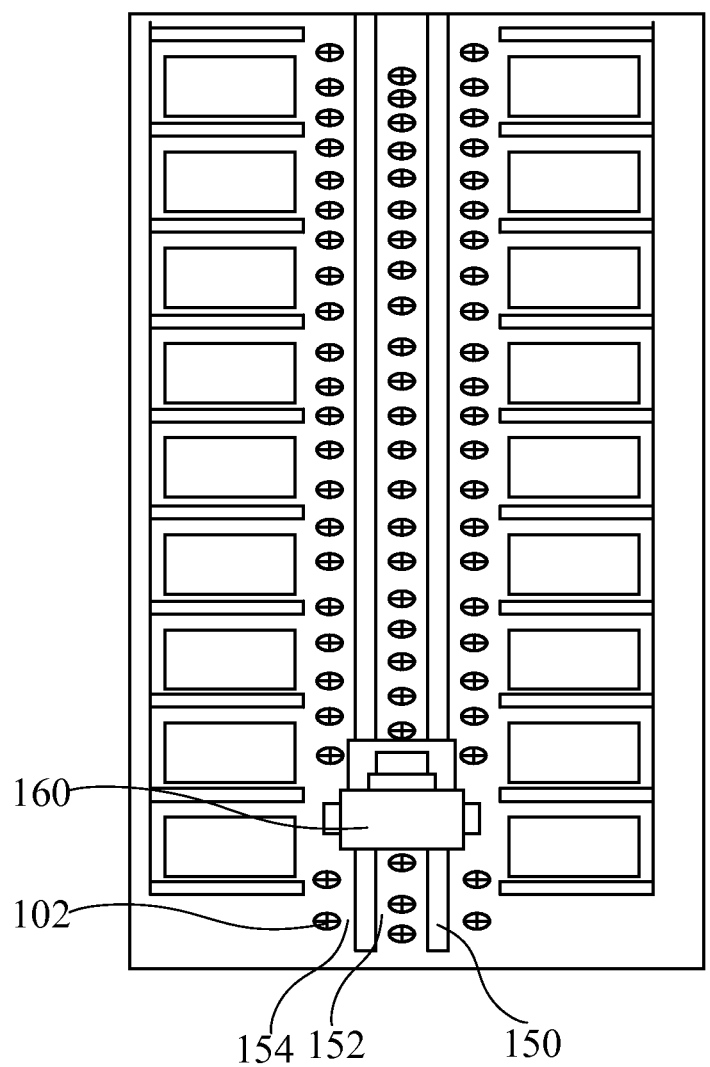
FIG. 2 is a schematic tap-view diagram showing the storage system of FIG. 1.

As illustrated in FIGS. 1 and 2, the present invention provides a storage system 10 for storing glass substrates. The storage system 10 contains a number of cleaning units 200 and a number of exhausts 102.

The exhausts 102 are configured along a bottom side of the storage system 10, and the cleaning units 200 are configured along a top side of the storage system 10. The cleaning units 200 provide clean air to the storage system 10 so as to expel dust particles and acid/alkaline gases.

Specifically, the storage system 10 according to the present invention contains a storage cabinet 101, at least a storage shelf 140, a guiding rail 150, an automated stacking device 160, and the cleaning units 200. The storage cabinet 101 is surrounded by a top plate 110, a bottom plate 130, and side plates 120.

The top plate 110 can be formed by piecing together multiple pieces. The top plate 110 has a number of installation openings and each cleaning unit 200 is installed in one installation opening. The cleaning unit 200 draws outside air, cleans the air, and blows the cleaned air into the storage system 10 through the installation opening.

There are four side plates 120. The top plate 110, the bottom plate 130, and the four side plates 120 jointly form the storage cabinet 101's a cubical space. Each side plate 120 can be formed by piecing together multiple pieces.

The bottom plate 130 is a raised floor relative to the ground. The bottom plate 130 can be formed by piecing together multiple pieces. The exhausts 102 are configured along the bottom plate 130. As shown in FIG. 2, the bottom plate 130 is configured with three columns of exhausts 102. The arrangement of the exhausts 102 is not limited to what is shown in FIG. 2.

The storage shelves 140 are positioned on the bottom plate 130, and each contains a number of storage chambers 141. Each storage chamber 141 stores a number of cartridges 142. A glass substrate is housed in a cartridge 142. As shown in FIG. 1, two storage shelves 140 are positioned along two lateral sides of the storage system 10. Each storage shelf 140 is formed by assembling multiple racks.

The guiding rail 150 is positioned on the bottom plate 130. The guiding rail 150 has two tracks, thereby separating the bottom plate 140 into an inner area 152 between the two tracks and an outer area 154 outside the two tracks. In a preferred embodiment, the guiding rail 150 is configured between the two storage shelves 140.

The automated stacking device 160 is configured on the guiding rail 150 and contains a lifting fork 162 for accessing the cartridges 142 on the storage shelves 140.

Figure 3:
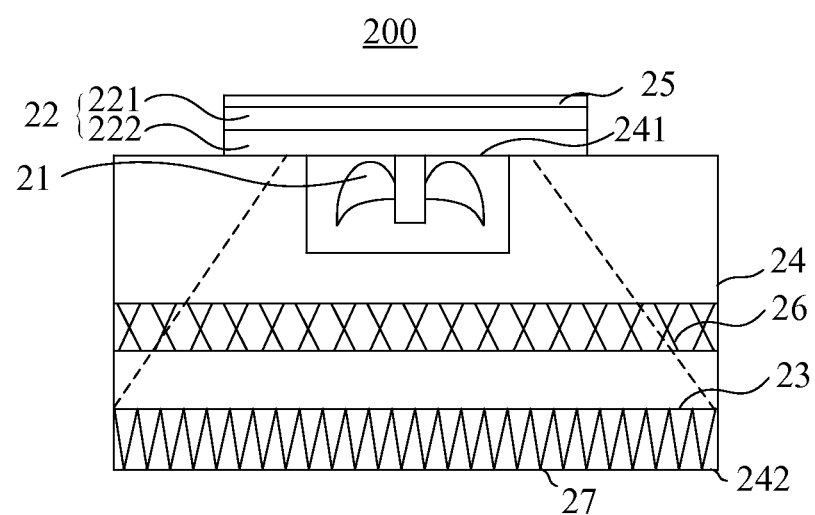
FIG. 3 is a schematic diagram showing an air cleaning unit of the storage system of FIG. 1.

Referring to FIG. 3, each air cleaning unit 200 contains a blower 21, an acid/alkaline filter device 22, and a particle filter device 23. The blower 21 draws in outside air through the acid/alkaline filter device 22 and produces an air flow through the particle filter device 23. The acid/alkaline filter device 22 is for absorbing the acid/alkaline gases in the outside air. The particle filter device 23 is for trapping the particles in the air flow.

Specifically, each air cleaning unit 200 further contains a case 24, an inlet pipe 25, a flow balance device 26, and an ion production device 27.

The case 24 is configured with an air inlet 241 and an air outlet 242. The inlet pipe 25 is connected to and surrounds the air inlet 241. The blower 21, the particle filter device 23, the flow balance device 26, and the ion production device 27 are housed inside the case 24. The blower 21 is positioned between the air inlet 241 and the particle filter device 23, and is for drawing outside air through the inlet pipe 25 and the air inlet 241.

The acid/alkaline filter device 22 is configured outside the case 24 in the inlet pipe 25 and covers the air inlet 241. The acid/alkaline filter device 22 contains a first filter layer 221 and a second filter layer 222. The first filter layer 221 is for filtering acid gases from the outside air drawn into the air cleaning unit 200. The second filter layer 222 is for filtering alkaline gases from the outside air drawn into the air cleaning unit 200. The outside air drawn by the blower 21 first passes through the acid/alkaline filter device 22 for removing acid/alkaline gases. As such, the air reaching the blower 21 does not contain acid/alkaline gases, and the blower 21 will not be eroded to produce particles or to suffer a shorter operation life span.

In alternative embodiments, the acid/alkaline filter device 22 further contains a third filter layer (not shown) for removing other undesirable gases in the outside air drawn into the air cleaning unit 200.

The flow balance device 26, the particle filter device 23, and the ion production device 27 are arranged sequentially layer by layer inside the case 24. The flow balance device 26 is configured at a distance from the blower 21, and the particle filter device 23 is configured at a distance from the flow balance device 26. The ion production device 27 is configured on an outer side of the particle filter device 23 and is positioned at the air outlet 242.

The particle filter device 23 contains a preparative filter, a high-performance filter, and an ultra-performance filter. The high-performance filter is capable of removing 99.97% particles having diameters greater than 0.3 micrometers (i.e., 1/200 of a hair's diameter) which is best for removing smoke, dusts, and bacteria. The ultra-performance filter is capable of removing 99.999% particles having diameters between 0.1 and 0.2 micrometers such as microbes.

The ion production device 27 not only has cleaning and filter functions but also produces ions. The ions would drop on the cartridges and glass substrates and remove the electrostatics on the glass surfaces. The ions carry negative charges and neutralize the smoke dusts carrying positive charges. As such, multiple particles are combined to become heavier and drop quickly to achieve clean air.

In contrast to the prior art, the blower 21 of each air cleaning unit 200 draws in air filtered by the acid/alkaline filter device 22. The blower 21 therefore does not suffer erosion and therefore the air cleaning unit 200 enjoys prolonged operation life span.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An air cleaning unit comprising
a case having an air inlet on a top side of the case and an air outlet on a bottom side of the case opposing the top side;
an inlet pipe from outside of the case joined to the top side of the case surrounding the air inlet where the air inlet and the inlet pipe cover a portion of the top side of the case;
an acid/alkaline filter device housed in the inlet pi e covering the air inlet the acid/alkaline filter device comprising a first filter layer absorbing acid gases and a second filter layer absorbing alkaline gases;
a blower inside the case beneath the air inlet;
a flow balance device inside the case at a distance below the blower;
a particle filter device inside the case at a distance below the flow balance device; and
an ion production device beneath the particle filter device immediately above and covering the air outlet;
wherein the blower draws outside air through the acid/alkaline filter device and produces an air flow through the case towards the air outlet; the acid/alkaline filter device absorbs acid/alkaline gases from the outside air; the particle filter device traps particles from the air flow; and the ion production device adds ions into the air flow.

2. A storage system for display panels comprising a storage cabinet and a plurality of air cleaning units as claimed in claim 1 delivering air flows to the storage cabinet, wherein the storage cabinet comprises a top plate, a bottom plate opposing the top plate; the air cleaning units are configured on the top plate; and a plurality of exhausts are configured on the bottom plate.

* * * * *